United States Patent
Kim et al.

(10) Patent No.: US 10,992,010 B2
(45) Date of Patent: Apr. 27, 2021

(54) METHOD FOR LAMINATION OF BATTERY CELL USING SOLVENT AND CHAMBER DEVICE FOR CARRYING OUT LAMINATION

(71) Applicant: LG CHEM, LTD., Seoul (KR)

(72) Inventors: Tae-Kyu Kim, Daejeon (KR); Cha-Hun Ku, Daejeon (KR); Won-Nyeon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 78 days.

(21) Appl. No.: 16/319,072

(22) PCT Filed: Nov. 9, 2017

(86) PCT No.: PCT/KR2017/012688
§ 371 (c)(1),
(2) Date: Jan. 18, 2019

(87) PCT Pub. No.: WO2018/088823
PCT Pub. Date: May 17, 2018

(65) Prior Publication Data
US 2019/0221811 A1 Jul. 18, 2019

(30) Foreign Application Priority Data
Nov. 9, 2016 (KR) .......................... 10-2016-0148984

(51) Int. Cl.
*H01M 50/46* (2021.01)
*B32B 37/14* (2006.01)
(Continued)

(52) U.S. Cl.
CPC ......... *H01M 50/46* (2021.01); *B32B 37/0038* (2013.01); *B32B 37/0046* (2013.01);
(Continued)

(58) Field of Classification Search
None
See application file for complete search history.

(56) References Cited

U.S. PATENT DOCUMENTS 5,778,515 A * 7/1998 Menon ................ H01M 2/1673
156/308.6
6,322,923 B1 11/2001 Spotnitz et al.
(Continued)

FOREIGN PATENT DOCUMENTS

CN 1265525 A 9/2000
CN 1328354 A 12/2001
(Continued)

OTHER PUBLICATIONS

International Search Report for PCT/KR2017/012688 dated Feb. 26, 2018.

*Primary Examiner* — Wyatt P McConnell
(74) *Attorney, Agent, or Firm* — Birch, Stewart, Kolasch & Birch, LLP

(57) ABSTRACT

The present disclosure provides a method for manufacturing a unit cell including the steps of: preparing an electrode and a separator individually, wherein the separator includes a porous polymer substrate and a porous coating layer disposed on at least one surface of the porous polymer substrate and including a mixture of inorganic particles with a binder polymer; applying a lamination solvent to the surface of the separator to be bound with the electrode; and carrying out lamination of the electrode with the separator before the lamination solvent is dried. The method according to the present disclosure can solve the problem of shrinking of a separator occurring in the conventional lamination process.

13 Claims, 4 Drawing Sheets

(51) Int. Cl.
  *B32B 37/00*     (2006.01)
  *H01M 50/403*    (2021.01)
  *H01M 50/446*    (2021.01)
  *H01M 50/449*    (2021.01)
  *H01M 10/052*    (2010.01)
  *H01M 10/0565*   (2010.01)
  *H01M 10/058*    (2010.01)

(52) U.S. Cl.
  CPC ........ *B32B 37/0053* (2013.01); *B32B 37/144* (2013.01); *H01M 10/052* (2013.01); *H01M 10/058* (2013.01); *H01M 10/0565* (2013.01); *H01M 50/403* (2021.01); *H01M 50/446* (2021.01); *H01M 50/449* (2021.01); *B32B 2457/10* (2013.01)

(56) References Cited

U.S. PATENT DOCUMENTS

| | | | |
|---|---|---|---|
| 6,337,101 | B1 | 1/2002 | Gozdz |
| 6,544,682 | B1 | 4/2003 | Takami et al. |
| 7,279,251 | B1 * | 10/2007 | Yun ........................ H01M 2/145 |
| | | | 429/129 |
| 7,396,607 | B2 | 7/2008 | Masaka et al. |
| 2001/0049872 | A1 | 12/2001 | Hong |
| 2005/0260490 | A1 | 11/2005 | Persi et al. |
| 2007/0269600 | A1 | 11/2007 | Gozdz et al. |

FOREIGN PATENT DOCUMENTS

| | | |
|---|---|---|
| JP | 6-256947 A | 9/1994 |
| JP | 8-148167 A | 6/1996 |
| JP | 9-213308 A | 8/1997 |
| JP | 2016-115457 A | 6/2016 |
| JP | 2017-98138 A | 6/2017 |
| KR | 10-1998-026047 A | 7/1998 |
| KR | 10-1999-0066849 A | 8/1999 |
| KR | 10-2002-0070439 A | 9/2002 |
| KR | 10-2009-0010083 A | 1/2009 |
| KR | 10-1006941 B1 | 1/2011 |
| KR | 10-2015-0131513 A | 11/2015 |

* cited by examiner

METHOD FOR LAMINATION OF BATTERY CELL USING SOLVENT AND CHAMBER DEVICE FOR CARRYING OUT LAMINATION

TECHNICAL FIELD

The present application claims priority to Korean Patent Application No. 10-2016-0148984 filed on Nov. 9, 2016 in the Republic of Korea, the disclosures of which are incorporated herein by reference.

The present disclosure relates to a method for lamination of a battery cell using a solvent and a chamber device for carrying out the lamination.

BACKGROUND ART

Recently, rechargeable secondary batteries have been used widely as energy sources or supplementary electric power devices for wireless mobile instruments. In addition, secondary batteries have been given many attentions as power sources for electric vehicles (EV), hybrid electric vehicles (HEV), plug-in hybrid electric vehicles (Plug-In HEV), or the like, which have been suggested as solutions for overcoming air pollution caused by the conventional gasoline vehicles, diesel vehicles, etc.

Such secondary batteries are manufactured to have a shape including an electrode assembly enclosed in a battery casing together with an electrolyte. The electrode assemblies may be classified into stacked type, folded type and stacked-folded type electrode assemblies, depending on their manufacturing methods. In the case of stacked type or stacked-folded type electrode assemblies, each of the unit cells forming an electrode assembly has a structure in which a separator is interposed between a positive electrode and a negative electrode and two or more unit cells are stacked successively. To obtain such unit cells, a lamination process is required to bind an electrode with a separator.

In general, a lamination process includes binding an electrode with a separator by heating and pressurization. For example, when the applied temperature is increased, melting of the organic ingredients forming a separator is induced to cause an increase in adhesion between an electrode and a separator. However, when the temperature is increased beyond a predetermined temperature, a polymer substrate (base material) is shrunk and the adhesion between an electrode and a separator becomes non-uniform undesirably. In addition, in a lamination process including binding an electrode with a separator by controlling pressure application (applied pressure), there is a problem in that a binder polymer is molten to cause blocking of the pores of the separator and an increase in resistance of a cell.

DISCLOSURE

Technical Problem

The present disclosure is designed to solve the problems of the related art, and therefore the present disclosure is directed to providing a method for lamination of a battery characterized by using a predetermined solvent to melt binder polymer ingredients contained in a separator. In this manner, it is possible to carry out lamination at low temperature and thus to carry out a lamination process while not causing shrinking of a separator.

The present disclosure is also directed to providing a lamination process which provides uniformly increased adhesion on the binding surface between an electrode and a separator.

In addition, the present disclosure is directed to providing a method for manufacturing a lithium secondary battery including the lamination process and a lithium secondary battery obtained by the method.

Further, the present disclosure is directed to providing a chamber device for carrying out the lamination.

Technical Solution

In one aspect of the present disclosure, there is provided a method for manufacturing a unit cell including the steps of: preparing an electrode and a separator individually, wherein the separator includes a porous polymer substrate and a porous coating layer disposed on at least one surface of the porous polymer substrate and including a mixture of inorganic particles with a binder polymer; applying a solvent for lamination ('lamination solvent') to the surface of the separator to be bound with the electrode; and carrying out lamination of the electrode with the separator before the lamination solvent is dried.

The lamination solvent is an organic solvent which has a boiling point of 90° C. or higher and is electrochemically inert. For example, the lamination solvent may have a boiling point of 90-100° C.

The lamination solvent may be dimethyl carbonate, ethyl propionate or a mixture thereof.

The binder polymer may be any one selected from the group consisting of polyvinylidene fluoride, polyvinylidene fluoride-co-hexafluoropropylene, polyvinylidene fluoride-co-chlorotrifluoroethylene, polymethyl methacrylate, polyvinyl pyrrolidone, polyvinyl alcohol, polyethylene-co-vinyl acetate, cellulose acetate, cellulose acetate butyrate, cellulose acetate propionate, pullulan, carboxymethyl cellulose and styrene butadiene rubber, or a combination of two or more of them.

The lamination solvent may be applied to the separator surface through a process which includes allowing a separator sheet and electrode sheets before lamination to pass through a sealed chamber in which the lamination solvent is contained in a vapor state, or by spraying the lamination solvent to the separator surface. Considering the harmfulness of the lamination solvent to the human body and applicability to mass production, use of the sealed chamber is preferred.

The temperature applied to the chamber device used for carrying out the lamination may be 90-100° C. Within the above-defined temperature range, the lamination solvent is vaporized so that it may be fused to the binder polymer.

In addition, nip pressure may be applied to a semi-finished product such as a bi-cell for the lamination, and the pressure applied in this case may be 100-120 kgf/cm.

In another aspect of the present disclosure, there is also provided a chamber device for carrying out the lamination. The chamber is provided with a container for receiving a lamination solvent at the bottom thereof, wherein a heat source for heating the lamination solvent to allow evaporation is provided around the container, the container has such a structure that it allows vaporization and evaporation of the lamination solvent received therein, the chamber has a sealed shape so that the lamination solvent vaporized from the container may be retained in the chamber, the chamber is provided with an inlet through which electrode sheets and a separator sheet are introduced and an outlet through which the electrode sheets laminated with the separator sheet are discharged, the chamber includes a conveying tube through which the vapor of the lamination solvent is conveyed, at the top thereof, the conveying tube is provided with a cooling unit at the downstream thereof so that the vapor of the lamination solvent may be condensed, and the conveying tube is connected back to the chamber so that the condensed lamination solvent may be returned to the chamber.

Advantageous Effects

According to the present disclosure, it is possible to carry out a lamination process at low temperature, and thus shrinking of a separator which occurs in the conventional lamination process is not generated.

In addition, according to the present disclosure, any excessive pressure is not required for the lamination, and thus it is possible to prevent or minimize the problem of blocking of pores in a separator caused by pressurization.

Further, when using the chamber for carrying out lamination according to the present disclosure, the lamination solvent may be fused to the binder polymer surface of the separator to carry out melting of the binder polymer effectively, to solve the problem of harmfulness to the human body and to allow application to mass production.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect, there is provided a method for manufacturing a unit cell including the steps of: preparing an electrode and a separator individually, wherein the separator includes a porous polymer substrate and a porous coating layer disposed on at least one surface of the porous polymer substrate and including a mixture of inorganic particles with a binder polymer; applying a solvent for lamination ('lamination solvent') to the surface of the separator to be surface-contacted with the electrode; and carrying out lamination of the electrode with the separator before the lamination solvent is dried.

Hereinafter, the method will be explained in more detail. First, an electrode and a separator are prepared (S1).

Electrodes, such as a positive electrode and a negative electrode, are obtained by coating a foil layer with a positive electrode or negative electrode. The positive electrode is obtained by applying a mixture of a positive electrode active material, a conductive material and a binder, followed by drying and compression. In the case of a negative electrode, similarly to a positive electrode, a negative electrode active material is applied to a negative electrode current collector, followed by drying and compression, and if necessary, a conductive material, binder or filler may be further incorporated.

Figure 1A:
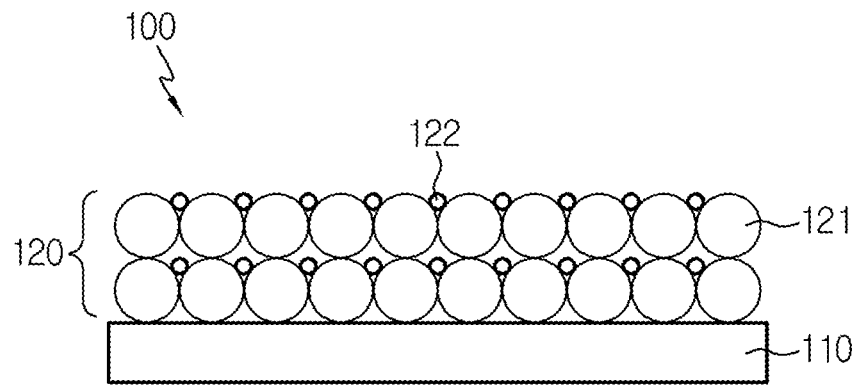
FIG. 1a is a schematic view illustrating the sectional surface of a separator according to an embodiment of the present disclosure, before a lamination solvent is applied.

The separator is a structural element which is interposed between the positive electrode and the negative electrode to prevent a short-circuit and allows transfer of ions. Referring to FIG. 1a, the separator includes a porous polymer substrate 100, and a porous coating layer 120 disposed on at least one surface of the porous polymer substrate and including a mixture of inorganic particles 121 and a binder polymer 122.

The porous polymer substrate is not particularly limited, as long as it meets the objects of the present disclosure, and may be any one selected from the group consisting of polyolefins, polyethylene terephthalate, polybutylene terephthalate, polyacetal, polyamide, polycarbonate, polyimide, polyether ether ketone, polyether sulfone, polyphenylene oxide, polyphenylene sulfide and polyethylene naphthalene. The polyolefin may be any one polymer selected from the group consisting of polyethylene, polypropylene, polybutylene and polypentene.

If necessary, the porous polymer substrate may have a layered structure formed of the polymers, such as polypropylene/polyethylene/polypropylene.

In the porous coating layer, the inorganic particles are attached to each other by the binder polymer (i.e., the inorganic particles are connected and fixed to each other by the binder polymer) so that they may be retained while being bound to each other. In addition, the porous coating layer is maintained in a state in which it is bound to the porous polymer substrate by the binder polymer. The inorganic particles of the porous coating layer may be in contact with each other substantially and the interstitial volumes formed when the inorganic particles are in contact with each other may form the pores of the porous coating layer.

Figure 1B:
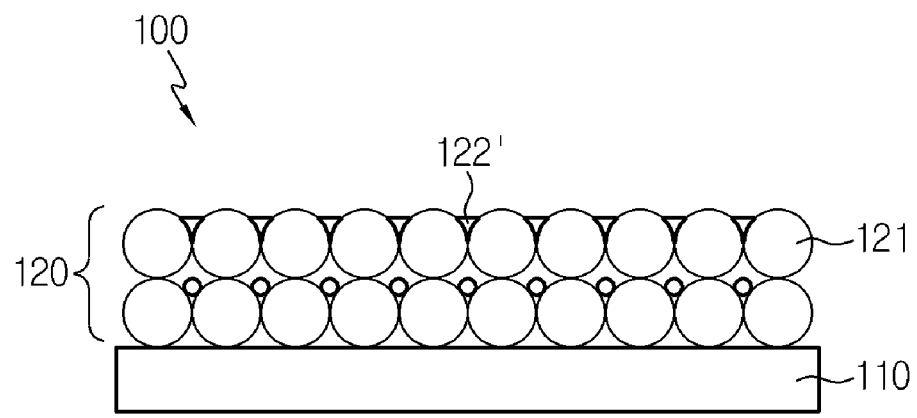
FIG. 1b is a schematic view illustrating the sectional surface of a separator, after a lamination solvent is applied.

The binder polymer used for the porous coating layer should be molten to a degree suitable for adhesion upon the application of the lamination solvent. FIG. 1b is a schematic view illustrating the binder polymer molten by the lamination solvent. Referring to the separator 100 shown in FIG. 1b, the porous coating layer 120 is formed on one surface of the porous polymer substrate 110 and the binder polymer 122' present on the surface of the porous coating layer is molten by the lamination solvent so that a smoother surface of the porous coating layer may be formed. In other words, the binder polymer 122' is converted into a status providing stronger adhesion and provides an increased adhesive surface. Meanwhile, when the binder polymer is converted completely into a liquid phase by the lamination solvent, the electrode-separator adhesion is decreased undesirably. In this context, it is preferred that the binder polymer has a melting point higher than the boiling point of the lamination solvent. Particular examples of the binder polymer that may be used in the present disclosure may be any one selected from the group consisting of polyvinylidene fluoride, polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polyvinylpyrrolidone, polyvinyl alcohol, polyethylene-co-vinyl acetate, cellulose acetate, cellulose acetate butyrate, cellulose acetate propionate, pullulan, carboxyl methyl cellulose and styrene-butadiene rubber, or a combination of two or more of them.

Cyanoethyl polyvinyl alcohol may be used as a dispersant when preparing slurry for forming the porous coating layer.

The inorganic particles used for the porous coating layer are not particularly limited, as long as they are electrochemically stable. In other words, the inorganic particles that may be used in the present disclosure are not particularly limited, as long as they not cause oxidation and/or reduction in a range of driving voltages (e.g. 0-5V based on $Li/Li^+$) of the corresponding electrochemical device. Particularly, when using inorganic particles capable of transporting ions, it is possible to increase the ion conductivity in an electrochemical device and to assist improvement of the performance of the electrochemical device. In addition, when using inorganic particles having a high dielectric constant, it is possible to contribute to an increase in dissociation degree of an electrolyte salt in an electrolyte, such as a degree of dissociation of a lithium salt, and thus to improve the ion conductivity of the electrolyte. For the above-mentioned reasons, it is preferred that the inorganic particles include high-dielectric constant inorganic particles having a dielectric constant of 5 or more, preferably 10 or more, inorganic particles capable of transporting lithium ions or a combination thereof.

In the porous coating layer, the weight ratio of the inorganic particles and binder polymer may be 10:90-99:1, particularly 80:20-95:5.

Next, a solvent for lamination is applied to the surface of the separator to be bound to the electrode (S2).

As used herein, it should be understood that 'solvent for lamination' or 'lamination solvent' means a solvent capable of melting the binder polymer used as an ingredient forming the separator when the solvent is applied to the separator surface in a vaporized state.

The lamination solvent is electrochemically inert when it is used as an ingredient forming a battery and may be an organic solvent having a boiling point of 90° C. or higher preferably. Non-limiting examples of such a lamination solvent include dimethyl carbonate, ethyl propionate or a mixture thereof. For example, when propylene carbonate was applied to polyvinylidene fluoride polymer as a lamination solvent, it was shown through an experiment that polyvinylidene fluoride was molten excessively and there is no significant effect of improving adhesion. Dimethyl carbonate is most preferred, since it improves the adhesive effect significantly. Although ethanol is a highly volatile compound having a boiling point lower than that of dimethyl carbonate by about 10° C., it was shown that ethanol cannot provide any desired effect of the present disclosure, i.e. a significant effect of fusion to a binder polymer and melting of the binder polymer. In addition, although acetone is highly volatile, it shows no effect of improving adhesion upon lamination.

In addition, the lamination solvent should melt the binder polymer present on the separator surface so that the roughness of the separator surface may be improved and the adhesion may also be improved.

As used herein, 'melting' means that the lamination solvent is fused to the binder polymer present in a solid state to allow 'state conversion of the fused binder polymer portion into a liquid state', wherein 'state conversion into a liquid state' means that the binder polymer undergoes a phase transition to liquid merely to a degree favorable to adhesion with an electrode. Therefore, it should be understood that a phase transition of the whole or most of the binder polymer to a level at which any improved adhesion cannot be provided is not within the scope of the present disclosure.

In addition, the lamination solvent should be applied to the separator surface in such an amount that it melts the binder polymer present on the separator surface to improve the adhesion but the pores of the separator are not blocked or the integrity of the structure formed from the inorganic particles forming the separator is not damaged by the binder polymer.

For this purpose, according to an embodiment of the present disclosure, a separator sheet and an electrode sheet are allowed to pass through a sealed chamber in which the lamination solvent is present in a vaporized state so that the vaporized lamination solvent may be fused to the binder polymer contained in the porous coating layer of the separator and the fused binder polymer portion may be molten. Otherwise, the lamination solvent may be sprayed directly to the porous coating layer surface of the separator.

The amount of the lamination solvent applied and fused to the separator may be 1-100 μL (microliters)/$cm^2$ or 1-20 μL/$cm^2$ or 5-15 μL/$cm^2$, but is not limited thereto. Since the inorganic particles and binder polymer are present in the separator porous coating layer and the lamination solvent is not fused to the inorganic particles, the lamination solvent is fused substantially to the binder polymer limitingly. When the lamination solvent is fused to the binder polymer in such an amount, it is possible to improve the adhesion of the binder polymer.

Then, before the lamination solvent is dried, the electrode is bound with the separator and lamination is carried out to obtain a unit cell (S3).

When the lamination is carried out in a sealed chamber, the electrode may be bound with the separator in the chamber. Herein, the chamber is prepared in such a manner that the inside of the chamber is saturated with the lamination solvent vapor and the internal temperature of the chamber is set to 90-100° C. so that the vaporized lamination solvent may not be condensed. When the lamination solvent is sprayed directly to the surface of the separator porous coating layer, the laminated temperature may be set to a lower temperature, such as 25-50° C.

Nip pressure is applied for the lamination. According to the present disclosure, it is possible to reduce the lamination pressure applied during the lamination of the electrode sheet with the separator sheet to a range of 100-120 kgf/cm. Therefore, there is no problem of blocking of the separator pores occurring in the related art.

According to the present disclosure, a period of time (chamber retention time) during which the separator sheet and the electrode sheet are introduced to the chamber before they are laminated with each other and then they are discharged after lamination corresponds to a significantly short period of time, considering the tag time of mass production. For example, the chamber retention time may be 0.1-10 seconds, 1-5 seconds or 2-3 seconds. Lamination can be carried out by applying the lamination solvent at low temperature and/or under low pressure for such a short period of time.

According to an embodiment of the present disclosure, a positive electrode, a negative electrode and a separator may form a full cell, bi-cell or an electrode assembly formed by stacking such cells. Herein, the electrode assembly may be realized in the form of a stacked electrode assembly, stacked and folded electrode assembly, or the like.

In addition, the electrode assembly may be received in a casing in the conventional manner and an electrolyte may be further introduced thereto if desired, and then sealing may be carried out to provide an electrochemical device. Preferably, the electrochemical device is a lithium secondary battery.

The electrolyte used according to the present disclosure may include an organic liquid electrolyte, inorganic liquid electrolyte, solid polymer electrolyte, gel polymer electrolyte, solid inorganic electrolyte, molten inorganic electrolyte, or the like, but is not limited thereto.

Particularly, the electrolyte may include an organic solvent and a lithium salt.

Any organic solvent may be used with no particular limitation, as long as it can function as a medium through which ions participating in the electrochemical reaction of the battery can be transported. Particular examples of the organic solvent may include: ester solvents, such as methyl acetate, ethyl acetate, γ-butyrolactone or ε-caprolactone; ether solvents, such as dibutyl ether or tetrahydrofuran; ketone solvents, such as cyclohexanone; aromatic hydrocarbon solvents, such as benzene or fluorobenzene; carbonate solvents, such as dimethyl carbonate (DMC), diethyl carbonate (DEC), methyl ethyl carbonate (MEC), ethyl methyl carbonate (EMC), ethylene carbonate (EC) or propylene carbonate (PC); alcohol solvents, such as ethyl alcohol or isopropyl alcohol; nitriles such as R-CN (wherein R is a C2-C20 linear, branched or cyclic hydrocarbon group which may include a double bonded aromatic ring or ether bond); amides such as dimethyl formamide; dioxolanes such as 1,3-dioxolane; or sulfolanes. Among those solvents, carbonate solvents are preferred and a combination of a cyclic carbonate (e.g. ethylene carbonate or propylene carbonate) having high ion conductivity and high dielectric constant capable of increasing the charge/discharge performance of a battery with a low-viscosity linear carbonate compound (e.g. ethyl methyl carbonate, dimethyl carbonate or diethyl carbonate) is more preferred. In this case, the cyclic carbonate and the chain-type carbonate may be mixed at a volume ratio of about 1:1 to about 1:9 with a view to excellent performance of an electrolyte.

Any lithium salt may be used with no particular limitation, as long as it is a compound capable of providing lithium ions used in a lithium secondary battery. Particular examples of the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like. The lithium salt may be used at a concentration ranging from 0.1M to 2.0M. Within the above-defined concentration of the lithium salt, the electrolyte has a proper conductivity and viscosity, and thus it is possible to provide excellent electrolyte performance and to allow effective transport of lithium ions.

In addition to the above-mentioned ingredients, the electrolyte may further include at least one additive, such as a haloalkylene carbonate compound (e.g. difluroethylene carbonate), pyridine, triethyl phosphite, triethanolamine, cyclic ether, ethylene diamine, n-glyme, triamide hexaphosphate, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, or aluminum trichloride, for the purpose of improvement of the life characteristics of a battery, inhibition of a decrease in battery capacity, improvement of discharge capacity of a battery, or the like. Herein, the additive may be used in an amount of 0.1-5 wt % based on the total weight of the electrolyte.

In another aspect, there is provided a chamber device for carrying out lamination. The chamber device is very useful when the lamination solvent is harmful to the human body. For example, when using dimethyl carbonate as an organic solvent, it is preferred to allow the lamination solvent to be fused to the separator binder polymer in the chamber.

Figure 2:
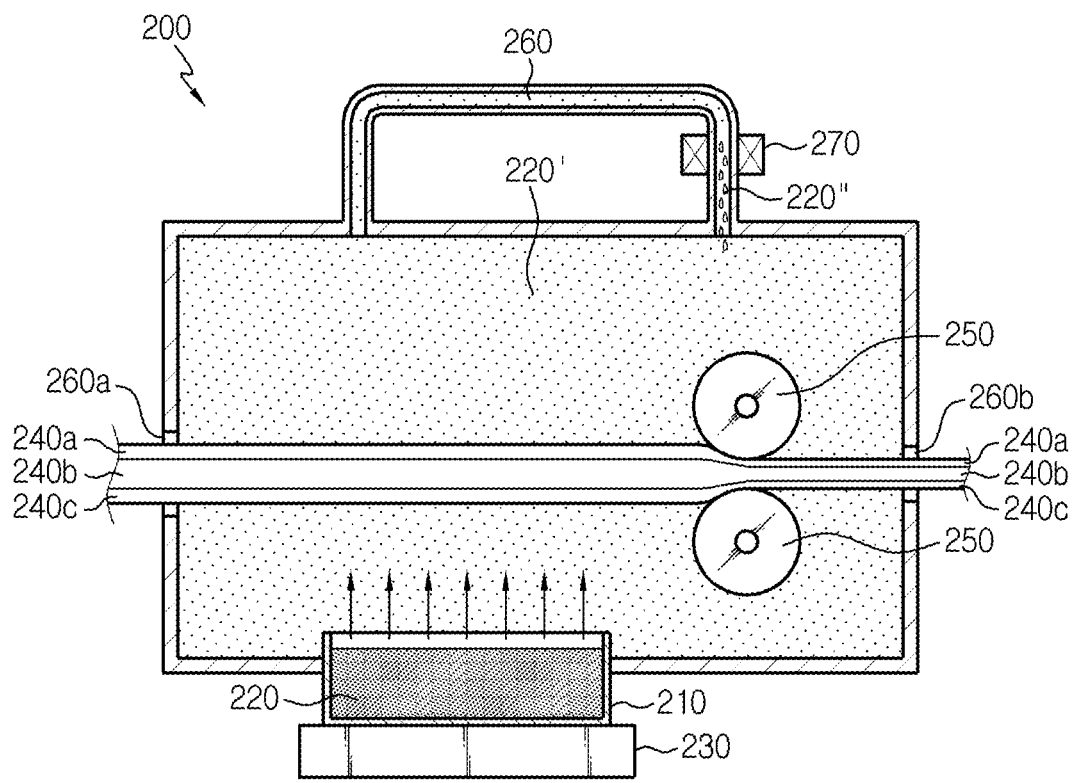
FIG. 2 is a schematic view illustrating the chamber device for carrying out lamination according to an embodiment of the present disclosure.

Referring to FIG. 2 illustrating the chamber device, the chamber 200 includes a container 210 for receiving a lamination solvent 220 at the bottom thereof, and a heat source 230 is provided around the container for heating the lamination solvent to allow evaporation. The container has such a structure that it allows exhaust of the lamination solvent received therein upon the vaporization, and the chamber has a sealed shape so that the lamination solvent vaporized from the container may be retained in the chamber. The chamber is provided with an inlet 260a through which electrode sheets 240a, 240c and a separator sheet 240b are introduced and an outlet 260b through which the electrode sheets 240a, 240c laminated with the separator sheet 240b, for example, by means of a roll 250, are discharged. The chamber includes a conveying tube 260 through which the vaporized lamination solvent is conveyed, at the top thereof. In addition, the conveying tube is provided with a cooling unit 270 at the downstream thereof so that the vaporized lamination solvent may be condensed. Further, the conveying tube is connected back to the chamber so that the condensed lamination solvent 220" may be returned to the chamber. The inside of the chamber 200 is saturated with the vapor 220' of the lamination solvent.

MODE FOR DISCLOSURE

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Manufacture of Separator

Polyvinylidene fluoride-co-hexafluoropropylene (PVdF-HFP, Solef 21510, Solvay Specialty Polymers Co., weight average molecular weight 300,000 g/mol, HFP 15 wt %) polymer and polyvinylidene fluoride-co-chlorotrifluoroethylene (PVDF-CTFE, Solef32008, Solvay Co., weight average molecular weight 280,000 g/mol) copolymer were used at a ratio of 7:2, were added to acetone to a combined weight of 10 wt %, and were dissolved therein at 50° C. for about 12 hours or more to obtain a binder polymer solution. In addition, $Al_2O_3$ powder (AES-11, Sumitomo Co.) was prepared as inorganic particles for forming a porous coating layer and cyanoethyl polyvinyl alcohol (CR-V, Shin-Etsu Chemical Co., Ltd.) was prepared as a dispersant.

Next, PVdF-HFP copolymer, PVDF-CTFE copolymer, $Al_2O_3$ powder and cyanoethyl polyvinyl alcohol were added at a weight ratio of 7:2:89.5:1.5 and $Al_2O_3$ powder was crushed and dispersed by using a bead mill process for 12 hours or more to obtain slurry for forming a porous coating layer.

The obtained slurry was coated onto both surfaces of the polyethylene porous polymer substrate (porosity 45%) having a thickness of 12 μm through a dip coating process and then dried to form porous coating layers on both surfaces of the porous polymer substrate. The resultant separator had a total thickness of 20 μm.

(2) Manufacture of Positive Electrode

First, 92 wt % of lithium cobalt composite oxide as a positive electrode active material, 4 wt % of carbon black as a conductive material and 4 wt % of PVdF as a binder were added to N-methyl-2-pyrrolidone (NMP) as a solvent to obtain positive electrode mixture slurry. The positive electrode mixture slurry was applied to aluminum foil as a positive electrode current collector having a thickness of 20 μm and dried to obtain a positive electrode. Then, roll pressing was carried out.

(3) Lamination Process

Dimethyl carbonate was sprayed to one surface of the separator in a sealed space so that dimethyl carbonate might be fused to the separator in an amount of 10 μL per unit area of 1 $cm^2$. While dimethyl carbonate is present in a liquid state, lamination was carried out through a roll lamination process so that the separator might be in contact with the positive electrode. Herein, a load of 100 kgf/cm was applied at 50° C.

Example 2

A positive electrode and a separator were manufactured in the same manner as Example 1, except that PVDF-HFP5 (LBG2, Arkema Inc., HFP 5 wt %) was used as a binder polymer instead of PVDF-HFP and PVDF-CTFE to prepare the slurry for forming a porous coating layer, and PVdF-HFP5, $Al_2O_3$ powder and cyanoethyl polyvinyl alcohol were used at a weight ratio of 8.5:90:1.5. Then, lamination was carried out in the same manner as Example 1.

Comparative Example 1

A positive electrode and a separator were manufactured in the same manner as Example 1, except that dimethyl carbonate was not used in the lamination process. Then, lamination was carried out in the same manner as Example 1.

Comparative Example 2

A positive electrode and a separator were manufactured in the same manner as Example 1, except that propylene carbonate was used instead of dimethyl carbonate in the lamination process. Then, lamination was carried out in the same manner as Example 1.

Comparative Example 3

A positive electrode and a separator were manufactured in the same manner as Example 2, except that propylene carbonate was used instead of dimethyl carbonate in the lamination process. Then, lamination was carried out in the same manner as Example 2.

Comparative Example 4

A positive electrode and a separator were manufactured in the same manner as Example 1, except that ethanol was used instead of dimethyl carbonate in the lamination process. Then, lamination was carried out in the same manner as Example 1.

Comparative Example 5

A positive electrode and a separator were manufactured in the same manner as Example 2, except that ethanol was used instead of dimethyl carbonate in the lamination process. Then, lamination was carried out in the same manner as Example 2.

Test Example: Adhesion Strength

Figure 3:
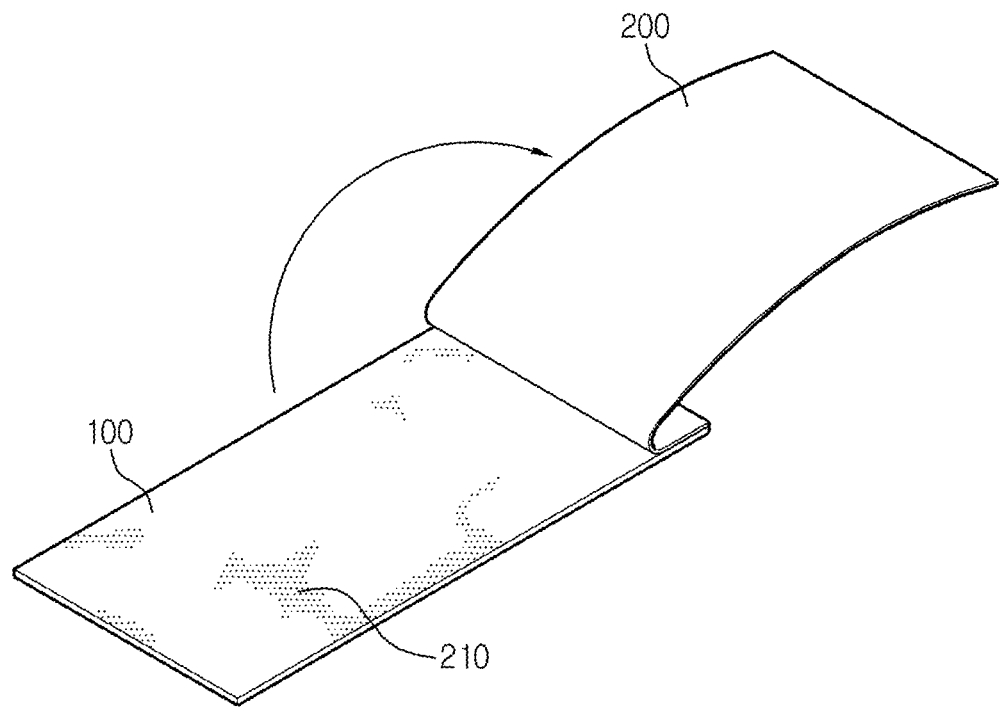
FIG. 3 and FIG. 4 are schematic views illustrating a separator removed from a positive electrode after laminating the positive electrode with the separator according to Examples 1 and 2, respectively.
Figure 4:
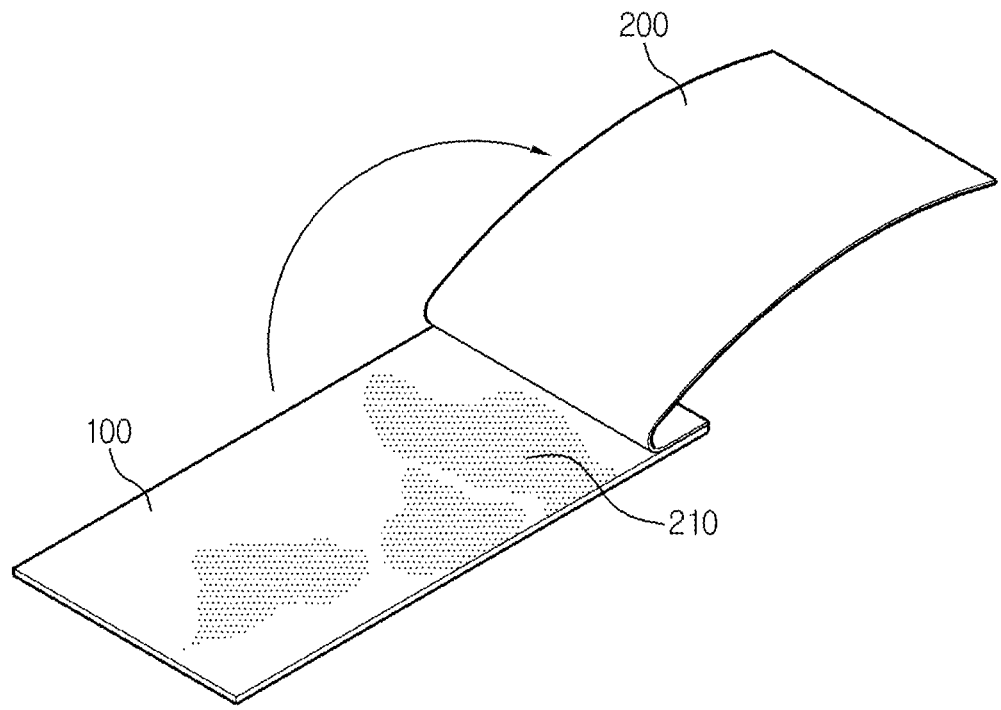
Figure 5:
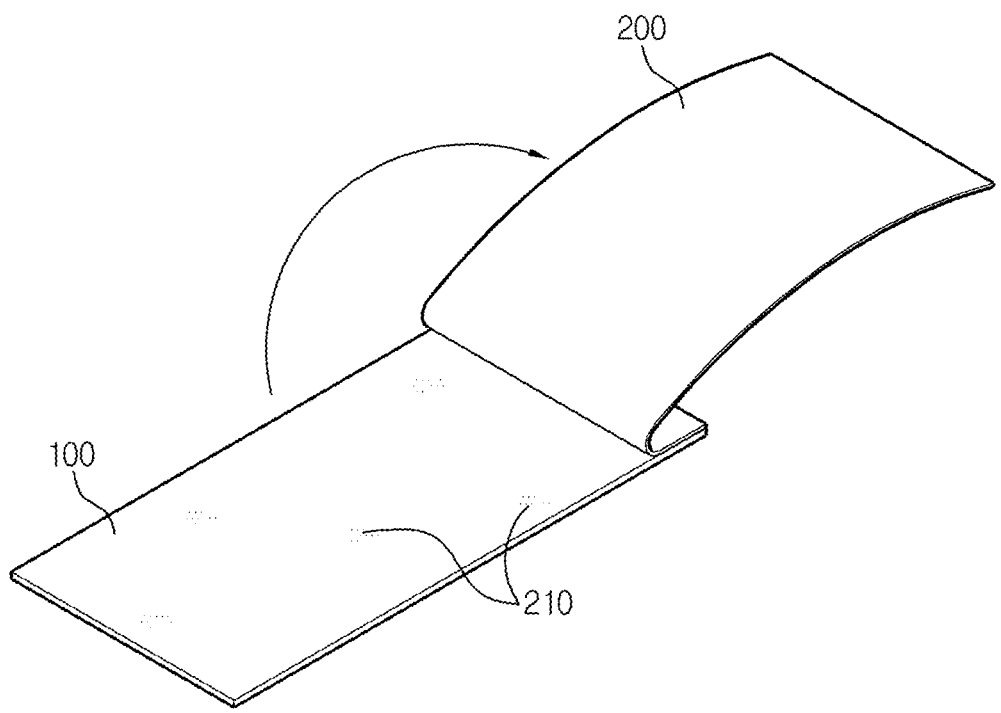
FIG. 5 and FIG. 6 are schematic views illustrating a separator removed from a positive electrode after laminating the positive electrode with the separator according to Comparative Examples 1 and 2, respectively.
Figure 6:
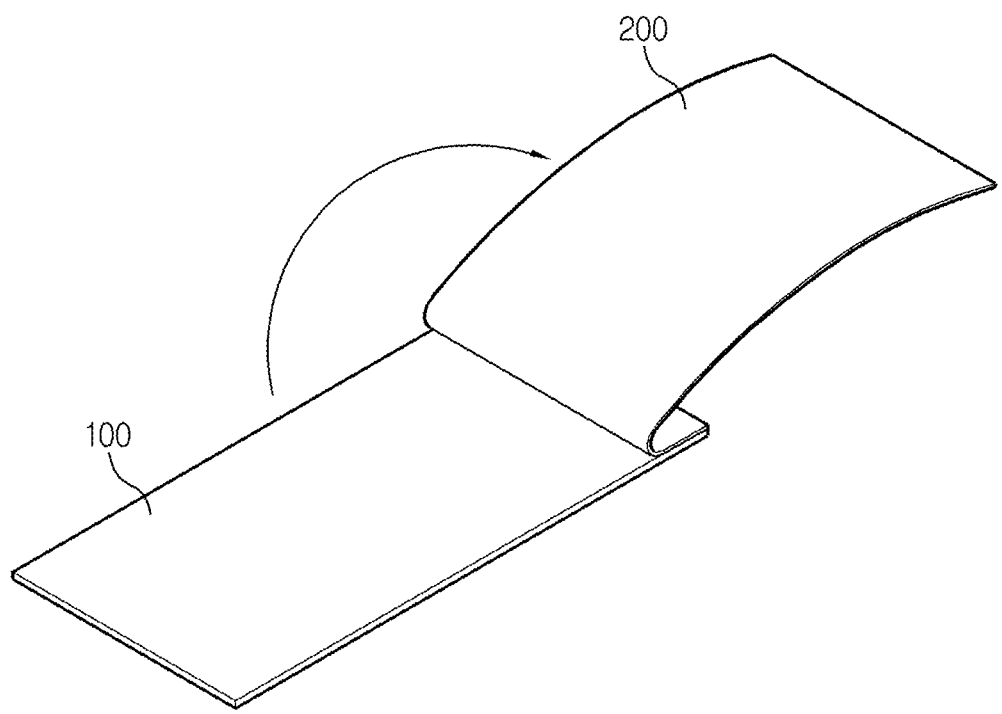
Figure 7:
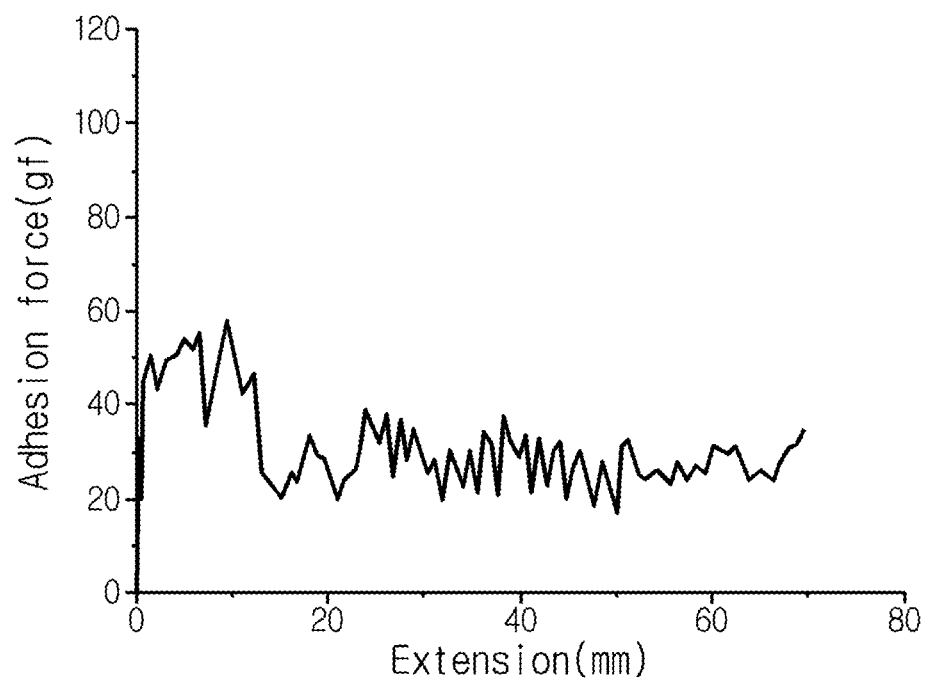
FIG. 7 is a graph illustrating the adhesion strength between the positive electrode and the separator according to Example 2.

The separator was peeled from each of the positive electrodes laminated with the separators according to Examples 1 and 2 and Comparative Examples 1-5 to evaluate the adhesion strength between the positive electrode and the separator. The adhesion strength was evaluated by peeling the separator manually from the positive electrode surface and checking the separator binder polymer transferred to the positive electrode surface by the naked eyes. The results are shown in FIG. 3 (Example 1), FIG. 4 (Example 2), FIG. 5 (Comparative Example 1) and FIG. 6 (Comparative Example 2) and the corresponding images are attached to Korean Patent Application No. 10-2016-0148984 which is priority of the present disclosure. In comparative examples 3 to 5, there is no or little binder polymer which was transferred from separator to surface of the positive electrode, and corresponding images are attached to Korean Patent Application No. 10-2016-0148984 which is priority of the present disclosure. In FIG. 3 to FIG. 6, 100 refers to a positive electrode, 200 refers to a separator and 210 refers to a binder polymer transferred to the positive electrode. In addition, the lamination strength of Example 2 is illustrated as a graph in FIG. 7. It is shown that the separator according to Example 2 provides a significantly improved lamination effect.

As a result, it is shown that Examples 1 and 2 according to the present disclosure provides adhesion between the positive electrode and the separator, while Comparative Examples 1-5 using no solvent or a solvent other than dimethyl carbonate in a lamination process provides little or no adhesion between the positive electrode and the separator.

It should be understood that the scope of the present disclosure is not limited to detailed description and specific examples but various embodiments can be realized within the scope of the present disclosure as define by the following claims. Various changes and modifications within the scope of the disclosure will become apparent to those skilled in the art from this detailed description.

What is claimed is:

1. A method for manufacturing a unit cell comprising the steps of:
   (1) preparing an electrode and preparing a separator individually,
      wherein the separator includes a porous polymer substrate and a porous coating layer disposed on at least one surface of the porous polymer substrate,
      wherein the porous coating layer comprises a mixture of inorganic particles with a binder polymer;
   (2) applying a lamination solvent to a surface of the separator to provide a surface-applied lamination solvent,
      wherein the surface of the separator is to be laminated with the electrode; and (3) laminating the electrode with the surface of the separator before the surface-applied lamination solvent is dried, wherein the lamination solvent is applied to the surface of the separator through a process which includes allowing the separator to pass through a chamber for a duration of time of 0.1 seconds to 10 seconds, and an internal temperature of the chamber is 90° C.-100° C. to keep the lamination solvent in a vapor state.

2. The method according to claim 1, wherein the lamination solvent is an organic solvent which has a boiling point of 90° C. or higher and is electrochemically inert.

3. The method according to claim 1, wherein the lamination solvent is dimethyl carbonate, ethyl propionate or a mixture thereof.

4. The method according to claim 1, wherein the binder polymer is any one selected from the group consisting of polyvinylidene fluoride, polyvinylidene fluoride-co-hexafluoropropylene, polyvinylidene fluoride-co-chlorotrifluoroethylene, polymethyl methacrylate, polyvinyl pyrrolidone, polyvinyl alcohol, polyethylene-co-vinyl acetate, cellulose acetate, cellulose acetate butyrate, cellulose acetate propionate, pullulan, carboxymethyl cellulose, styrene butadiene rubber, and a combination of two or more thereof.

5. The method according to claim 1, wherein the lamination solvent is applied to the surface of the separator through the process which includes allowing the separator to pass through the chamber in which the lamination solvent is contained in the vapor state, or by spraying the lamination solvent to the surface of separator.

6. The method according to claim 1, wherein a nip pressure of 100-120 kgf/cm is applied for the lamination.

7. A chamber device for carrying out the lamination as defined in claim 1, comprising:
rolls to perform (3) laminating the electrode within the chamber; and
a container and a heat source,
wherein the container is configured for receiving the lamination solvent at the bottom thereof,
wherein the heat source is provided around the container for heating the lamination solvent to allow evaporation of the lamination solvent to a vapor,
wherein the container is configured for vaporization and evaporation of the lamination solvent received therein,
wherein the chamber has a sealed shape so that the lamination solvent vaporized from the container and in the vapor state is retained in the chamber,
wherein the chamber is provided with an inlet through which electrode sheets and a separator sheet are introduced and an outlet through which the electrode sheets laminated with the separator sheet are discharged,
wherein the chamber comprises a conveying tube through which the vapor of the lamination solvent is conveyed, at the top thereof,
wherein the conveying tube is provided with a cooling unit at the downstream thereof so that the vapor of the lamination solvent may be condensed, and
wherein the conveying tube is connected back to the chamber so that the condensed lamination solvent may be returned to the chamber.

8. The method according to claim 1, wherein the lamination solvent contained in the chamber is in the vapor state.

9. The method according to claim 5, wherein a laminate temperature when spraying the lamination solvent to the surface of the separator is 25° C.-50° C.

10. The method according to claim 1, wherein the duration of time is 1 second to 5 seconds.

11. The method according to claim 1, wherein the duration of time is 2 seconds to 3 seconds.

12. The method according to claim 1, wherein (3) laminating the electrode is performed using rolls located within the chamber.

13. A method for manufacturing a unit cell comprising the steps of:
(1) preparing an electrode and preparing a separator individually,
wherein the separator includes a porous polymer substrate and a porous coating layer disposed on at least one surface of the porous polymer substrate,
wherein the porous coating layer comprises a mixture of inorganic particles with a binder polymer;
(2) applying a lamination solvent to a surface of the separator,
wherein the surface of the separator is to be laminated with the electrode; and
(3) laminating the electrode with the surface of the separator before the lamination solvent is dried,
wherein the lamination solvent is dimethyl carbonate, ethyl propionate or a mixture thereof,
wherein the binder polymer has a higher melting point than a boiling point of the lamination solvent, and
wherein the lamination solvent is applied to the surface of the separator through a process which includes allowing the separator to pass through a chamber in which the lamination solvent is contained in a vapor state, or by spraying the lamination solvent to the surface of the separator.

* * * * *